United States Patent
Chen

(10) Patent No.: US 7,292,337 B2
(45) Date of Patent: Nov. 6, 2007

(54) OPTICAL PROCESSOR USING DETECTING ASSEMBLY AND METHOD USING SAME

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 265 days.

(21) Appl. No.: 11/145,437

(22) Filed: Jun. 3, 2005

(65) Prior Publication Data

US 2006/0007438 A1    Jan. 12, 2006

(30) Foreign Application Priority Data

Jul. 9, 2004    (TW) ............................... 93120621 A

(51) Int. Cl.
    *G01J 3/28* (2006.01)
(52) U.S. Cl. ....................... 356/328; 356/418
(58) Field of Classification Search ............... 356/328, 356/334, 418
    See application file for complete search history.

(56) References Cited

U.S. PATENT DOCUMENTS

| 4,264,205 A | * | 4/1981 | Landa ......................... 356/326 |
| 6,412,972 B1 | | 7/2002 | Pujol et al. .................. 362/272 |
| 6,811,267 B1 | * | 11/2004 | Allen et al. .................. 353/122 |
| 7,207,678 B2 | * | 4/2007 | Penn ............................ 353/81 |
| 2005/0231651 A1 | * | 10/2005 | Myers et al. ................ 348/744 |

* cited by examiner

*Primary Examiner*—Gregory J. Toatley, Jr.
*Assistant Examiner*—Kara Geisel
(74) *Attorney, Agent, or Firm*—Morris Manning Martin LLP; Tim Tingkang Xia, Esq.

(57) ABSTRACT

An optical processor includes a light source (20), a grating device (23), a first lens (24), a reflector (25), a second lens (26), an array of mirror cells (28), a color wheel (29), and a third lens (30). The light source is for generating a number of light beams. The grating device is for reflecting and dispersing the generated light beams. The first lens is for imaging the reflected and dispersed light beams. The reflector is for reflecting the imaged light beams. The second lens is for correcting any aberration of the reflected light beams. The array of mirror cells is for reflecting the light beams received from the second lens. The color wheel is for coloring the reflected light beams. The third lens is for projecting the colored light beams onto a display.

13 Claims, 3 Drawing Sheets

OPTICAL PROCESSOR USING DETECTING ASSEMBLY AND METHOD USING SAME

FIELD OF THE INVENTION

The present invention generally relates to optical processors used in devices such as precision instruments, and more particularly to a detecting assembly for an optical processor.

BACKGROUND OF THE INVENTION

Spectrum technology is a relatively new high-tech field which incorporates optics, spectroscopy, precision machinery, electronics technology and computer techniques. Spectrum technology assists a user to obtain plenty of information pertaining to a space or a spectrum. Because of this great advantage, spectrum technology has numerous applications in pursuits such as navigation, scientific experimentation, industrial manufacturing, agriculture, geology, oceanography, and safety devices. Similarly, spectrum technology already has a great reputation in the development of optical instruments.

A spectrograph is an essential piece of equipment for performing spectrum analysis. Analyzing a spectrum can provide information about elements composing a substance, and can show information about energy levels or the interaction between energy levels in an atom. To find out the structure of an atom or a molecule, spectrum analysis is a key method. Most knowledge of atomic structures is obtained from the early analysis of atomic spectra.

A conventional spectrograph separates electromagnetic radiation having short wavelengths into its spectral components. Generally, such spectrograph comprises a collimating system, a dispersing system and a receiving system. The dispersing system of a grating spectrograph is a diffractive optical grating device. A typical grating spectrograph is disclosed in "A New Way of Multiple Paths Spectrograph-medium-level Spectrograph" (Spectroscopy and Spectrum Analysis; April 1991). As represented in FIG. 3 hereof, the grating spectrograph comprises the following components along a continuous optical path: a light source 1, an entrance slit plate 2, a collimator 3, a diffractive optical grating device 4, an aspherical lens 5, a planar mirror 6, an exit slit plate 7, a light detector 8, and an imaging device 9.

The operational flow of the grating spectrograph is as follows. The light source 1 generates light beams. The light beams pass through the entrance slit plate 2. After being made parallel by the collimator 3, the light beams directly enter the diffractive optical grating device 4. The diffracted light beams then pass through the aspherical lens 5 having a planar surface and a curved surface. The light beams are thus separated and corrected to form a two-dimensional spectrum. The light beams are then reflected by the planar mirror 6 to a focal plane having the exit slit plate 7 located thereon. The exit slit plate 7 has a plurality of exit holes for the light beams to pass through. The light beams pass through the exit holes of the exit slit plate 7. The light detector 8 performs spectrum analysis of the light beams. Finally, the light beams are output by the light detector 8 and imaged by the imaging device 9.

The light detector 8 is conventionally a photoelectric detector such as a photomultiplier. The photomultiplier detects the intensity of the light beams passing through the exit slit plate 7. However, in each detecting step, the photomultiplier can only obtain optical data of one wavelength point. That is, the photomultiplier cannot obtain optical data of a number of wavelength points simultaneously, nor even within the space of a few microseconds.

In general, to achieve the measurement of a plurality of wavelength points, a precision machine driving a machinery scanner is provided to assist the photomultiplier. In such driving, however, the data of all wavelength points still cannot be measured within the space of a few microseconds. Furthermore, the intensities of the light beams cannot be wholly detected if they are continuously varied.

Since the 1960s, in addition to a photomultiplier, a charged coupled device (CCD) has been applied in a typical spectrograph. The CCD analyzes a spectrum according to the following operational steps. When the CCD is exposed to a plurality of light beams, each CCD unit stores charges proportional to its exposure. If a pulse having a specific sequence is applied to the CCD, the stored charges of the CCD unit can be directionally transmitted in the CCD, and a self-scanning step can be performed. The stored charges are then transmitted out step by step.

The CCD is able to detect data of a plurality of wavelength points in a specific wavelength range. If the output stored charges due to the pulse are A/D (analog-to-digital) transformed and then sequentially input to a computer, the computer can gather, analyze and process the transformed charges. The screen of the computer then shows the distribution graph of the light intensity of the transformed charges, and a fast spectrum analysis is thereby provided.

However, both the CCD and the photomultiplier transform optical signals (the light beams from the light source) into electrical signals for a computer to subsequently process. The requirement of transformation from optical signals to electrical signals limits the photomultiplier or CCD to be sensitive only to wavelengths in the range from 200 nm to 1100 nm. Outside of the above range, the data of the wavelength points cannot be obtained.

What is need, therefore, is an optical processor which overcomes the above-mentioned problems.

SUMMARY

A first embodiment provides an optical processor. The optical processor may include a light source, a collimator, a grating device, a first lens, a reflector, a second lens, an array of mirror cells, a color wheel and a third lens. The light source is for generating a number of light beams. The collimator is for collimating the generated light beams. The grating device is for reflecting and dispersing the collimated light beams. The first lens is for imaging the reflected and dispersed light beams. The reflector is for reflecting the imaged light beams. The second lens is for correcting any aberration of the reflected light beams. The array of mirror cells is for reflecting the light beams received from the second lens. The color wheel is for coloring the reflected light beams. The third lens is for projecting the colored light beams onto a display.

A second embodiment provides a detecting assembly for a spectrograph. The detecting assembly may include first means, second means, third means and fourth means. The first means is for firstly reflecting a number of light beams to a color wheel, wherein the first reflected light beams serve as a first optical signal. The second means is for secondly reflecting the light beams to a light absorber, wherein the second reflected light beams serve as a second optical signal. The third means is for thirdly reflecting the light beams to the color wheel, wherein the third reflected light beams serve as a third optical signal. The fourth means is for digitally displaying the first and the third optical signals by projecting the first and the third reflected light beams onto a display.

A third embodiment provides a method of detecting a plurality of light beams in a spectrograph. The method may include a first reflecting step, a second reflecting step, a third reflecting step and a displaying step. In the first reflecting step, the light beams are reflected to a color wheel, wherein the reflected light beams serve as a first optical signal. In the second reflecting step, the light beams are reflected to a light absorber, wherein the reflected light beams serve as a second optical signal. In the third reflecting step, the light beams are reflected to the color wheel again, wherein the reflected light beams serve as a third optical signal. In the displaying step, the first and the third optical signals are digitally displayed by projecting the first and the third reflected light beams onto a display.

Other advantages and novel features of the described embodiments will be drawn from the following detailed description with reference to the attached drawings.

DETAILED DESCRIPTION OF PREFERRED EMBODIMENTS

Figure 1:
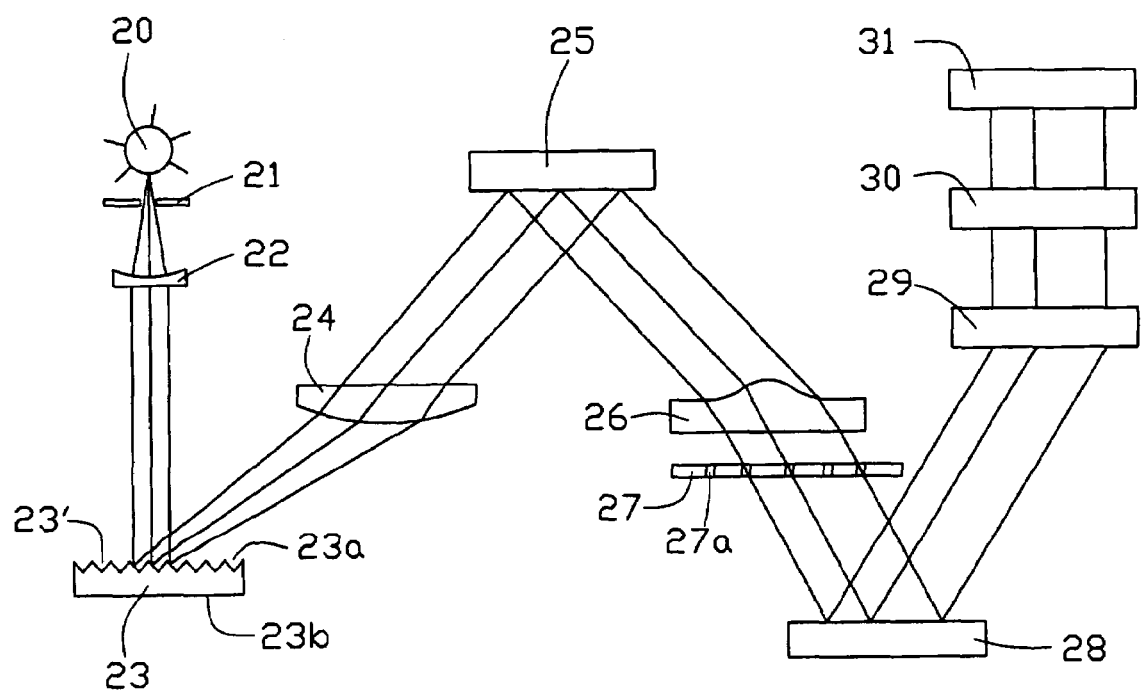
FIG. 1 is a schematic, top plan optical path diagram of an optical processor in accordance with a preferred embodiment of the present invention.

Referring to FIG. 1, a first embodiment provides an optical processor. The optical processor, typically for a spectrograph, includes a light source 20, a first slit plate 21, a collimator 22, a grating device 23, a first lens 24, a reflector 25, a second lens 26, a second slit plate 27, an array of mirror cells 28, a color wheel 29, a third lens 30 and a screen 31 all located along a continuous optical path. The light source 20 is an inductively-coupled-plasma source (ICP source) for emitting light beams. The ICP source has the advantages of satisfactory stability, high excitation temperature, wide linear range, and rare chemical interference. Alternatively, a laser source can be used as the light source 20.

The light beams enter the collimator 22 via the first slit plate 21. The first slit plate 21 is an entrance slit plate, and is positioned between the light source 20 and the collimator 22. The collimator 22 gathers the light beams from the first slit plate 21, and collimates the light beams into parallel light beams.

The grating device 23 is a kind of phase-type optical device, and is preferably a diffractive optical grating device. The grating device 23 and the light source 20 are spaced apart a particular distance. If the distance is great enough to assume that the light beams entering the grating device 23 are substantially parallel, then the collimator 22 can be omitted.

The grating device 23 includes a planar surface 23b and a non-planar surface 23a. The non-planar surface 23a reflects the parallel light beams received from the collimator 22 or the first slit plate 21. The grating device 23 further includes a plurality of grooves 23' on the non-planar surface 23a. With the grooves 23', the thickness of the grating device 23 varies along the non-planar surface 23a. Due to the thickness variation, the non-planar surface 23a of the grating device 23 is capable of reflecting the parallel light beams to form a spectrum distribution on a focal plane. The parallel light beams received from the collimator 22 (or the first slit plate 21) induce coma aberration and flare. The coma aberration and flare cause distortion aberration and curvature of field to the parallel light beams. When the parallel light beams are reflected by the grating device 23, the distortion aberration and the curvature of field are substantially corrected by the grooves 23' of the grating device 23.

When parallel light beams enter the grooves 23' on the non-planar surface 23a, diffraction occurs due to the geometry of the grooves 23'. In this diffraction, a grating equation can be expressed in the following way: $d \sin \theta = k\lambda (k=0, \pm 1, \pm 2, \ldots)$, where d is the grating constant of the grating device 23, $\lambda$ is a wavelength of the light beams, k is the diffraction order, and $\theta$ is the diffraction angle. The values of k specify the order of various principal maxima. The principal maximum of each k order shows up as a thin and bright line.

After the light beams with the wavelengths enter the grating device 23, the thin and bright lines of the principal maxima are arranged to respectively correspond to the wavelengths of the light beams. The combination of the lines, shown on the focal plane of the first lens 24 (e.g., a focus lens), is a so-called diffractive spectrum. The greater the absolute value of the diffraction order k, the more dispersive the corresponding lines, and the lower the energy of the corresponding light beams.

When the grating device 23 is rotated to an oblique angle relative to the parallel light beams, the wavelength range of the diffractive spectrum is changed. Based on this changeability, spectra with different wavelength ranges can be analyzed. Additionally, the number of grooves 23' may be adjusted to detect different wavelength ranges of the diffractive spectrum. The number of grooves 23' may be adjusted by using a new grating device 23 having a different number of grooves to replace the original grating device 23. This additional adjustment enables the optical processor to detect a spectrum having wavelengths in the range from 200 nm to 1600 nm.

After the diffractive spectrum is formed on the first lens 24, the light beams pass through the first lens 24 and are then reflected by the reflector 25. The reflector 25 reflects the light beams to the second lens 26, which may for example be an aspherical correction lens. The second lens 26 generates no three-dimensional spectrum focal plane, unlike what is often the case if a conventional prism is used. Further, the second lens 26 replaces a conventional combination of a prism and a focus lens, thereby saving space, avoiding light loss, and eliminating aberration and chromatism. After the light beams pass through the second lens 26, they pass through exit holes 27a of the second slit plate 27 and then strike the array of mirror cells 28.

The array of mirror cells 28 serves as a digital micromirror device, and is preferably a special semiconductor chip. The array of mirror cells 28 is made by simultaneously locating and forming optical devices through micro electro mechanical system (MEMS) technology. Using MEMS technology, the formed array of mirror cells 28 can be precisely aligned with the striking light beams.

The array of mirror cells 28 reflects the light beams to the color wheel 29 for RGB coloring. The color wheel 29 colors the light beams, and the colored light beams then propagate to and are projected by the third lens 30. The third lens 30 is preferably a projection lens, and projects and focuses the light beams onto a monitor 31 (or a screen or a display). The monitor 31 images the light beams, so that a spectrum image is output.

The light beams processed by the optical processor may have some special frequencies. In use of the optical processor, the responses of special frequencies are measured by a modulation-transfer-function (MTF) technique. Such measurement evaluates the quality of the optical processor and the devices thereof. In measurement of visible light, the light image is electrically scanned by a detector (not shown) that includes an array of photodiodes. Such detector performs the measurement promptly, and additionally measures the focal length, back focal distance and optical deformation of the devices. "Back focal distance" means the distance from a flange of a lens (at the edge of the lens mount) to a focal plane of the lens.

Figure 2:
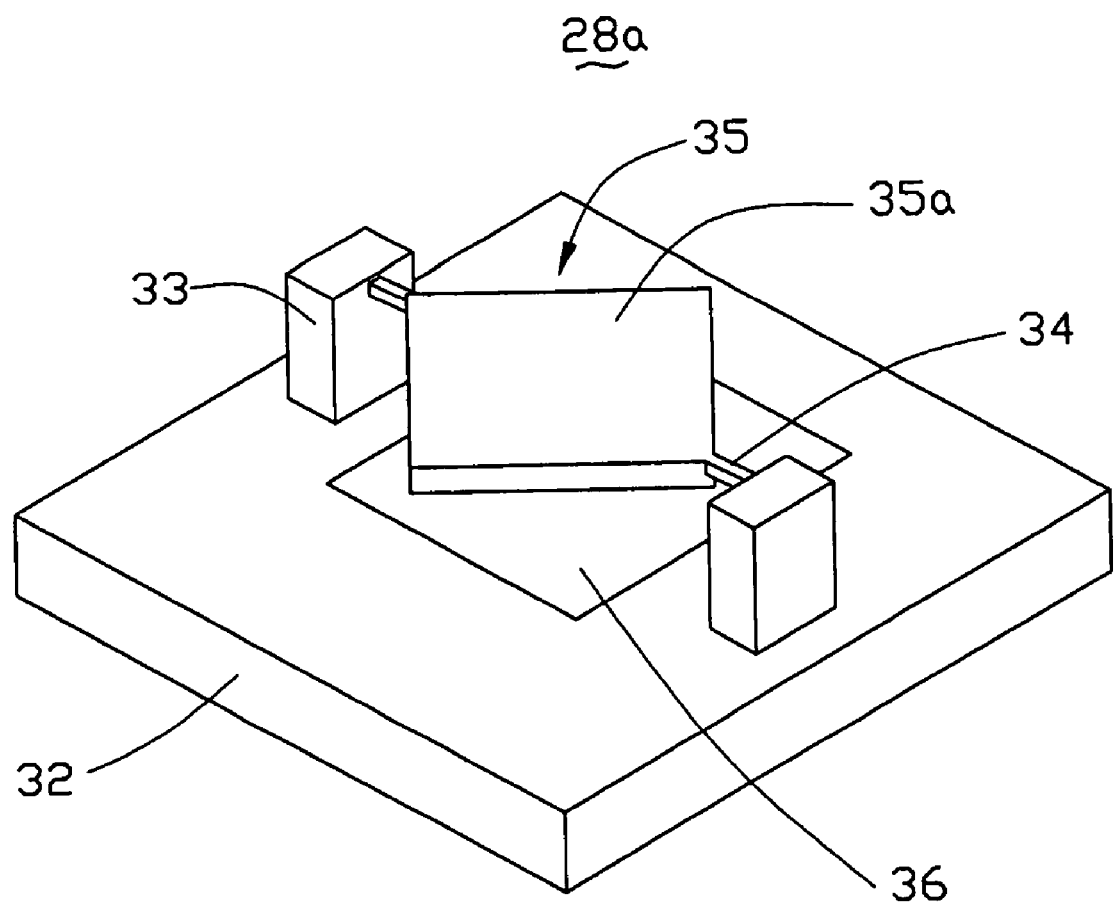
FIG. 2 is an enlarged, isometric view of a mirror cell of an array of mirror cells of the optical processor of FIG. 1.
Figure 3:
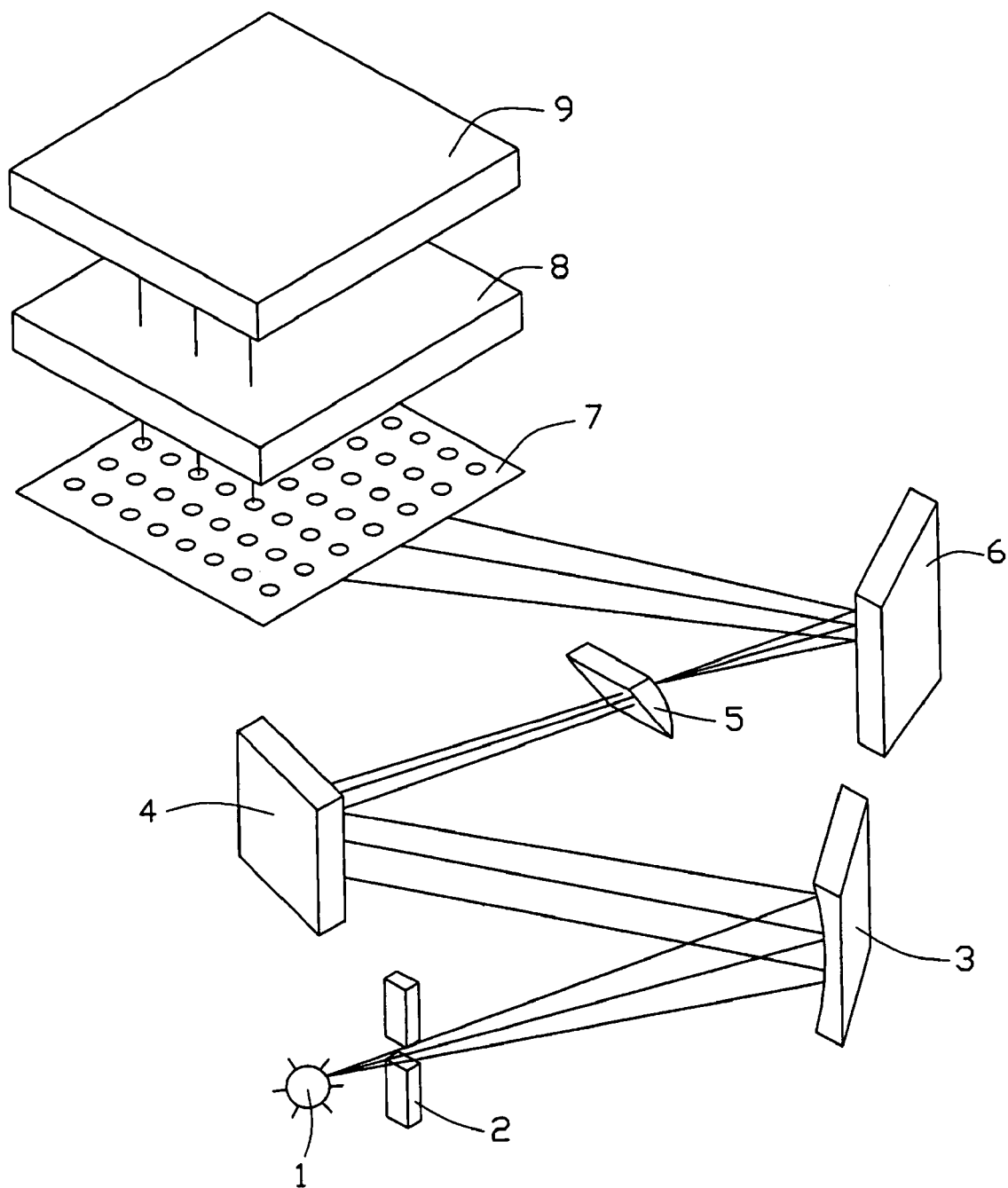
FIG. 3 is a schematic, isometric optical path diagram of a conventional grating spectrograph.

Referring to FIG. 2, each of mirror cells 28a of the array of mirror cells 28 includes a square mirror 35 and a driver 36 on a silicon substrate 32. The square mirror 35 is a preferably a silicon chip, and includes a reflecting plane 35a. The driver 36 is for tilting the square mirror 35 on the silicon substrate 32, and includes an electrode. The driver 36 is provided under the square mirror unit 35, on a top surface of the silicon substrate 32.

Each of the mirror cells 28a further includes two pedestals 33 and two cantilevers 34. The pedestals 33 are positioned at opposite sides of the square mirror 35 respectively, and support the cantilevers 34 respectively. The cantilevers 34 are for cantilevering the square mirror 35.

The square mirrors 35 and the color wheel 29 collectively serve as a detecting assembly for the optical processor. In operation of the detecting assembly, the square mirrors 35 firstly reflect the light beams to the color wheel 29. The first reflected light beams serve as a first optical signal. After the first reflection, the square mirrors 35 secondly reflect the light beams to a light absorber (not shown) within microseconds. The second reflected light beams serve as a second optical signal representing "0." After the second reflection, the square mirrors 35 thirdly reflect the light beams to the color wheel 29 within microseconds. The third reflected light beams serve as a third optical signal. The first and the third optical signals, which respectively represent "1," are digitally displayed by being projected onto the monitor 31. This projection is performed by the third lens 30.

The first, second and third reflecting steps are performed by tilting the normal line of the square mirror 35 using the driver 36. The driver 36 is able to drive the square mirror 35 to tilt the normal line to an angle of about 10 to −10 degrees or about 12 to −12 degrees.

Referring to FIG. 1, in summary, the present invention provides the array of mirror cells 28 made on a micro scale. According to the present invention, the array of mirror cells 28, the color wheel 29 and the third lens 30 are operated to transform the first and the third optical signals into two spectrum images. In the prior art, if the first and the third optical signals are transformed into electrical signals before being transformed into the spectrum images, a photomultiplier or a charged coupled device (CCD) is conventionally used. Such photomultiplier or CCD is limited to sensing short wavelengths of light beams only. The present invention requires no photomultiplier or CCD, and directly transforms the first and the third optical signals into the spectrum images. Therefore, the present invention is able to sense a wider range of wavelengths of light beams.

Although only preferred embodiments and a preferred method have been described in detail above, it will be apparent to those skilled in the art that various modifications are possible without departing from the inventive concepts herein. Therefore the invention is not limited to the above-described embodiments and method, but rather has a scope defined by the appended claims and allowable equivalents thereof.

What is claimed is:

1. An optical processor comprising:
a light source for generating a plurality of light beams;
a grating device for reflecting and dispersing the generated light beams;
a first lens for imaging the reflected and dispersed light beams;
a reflector for reflecting the imaged light beams;
a second lens for correcting any aberration of the reflected light beams;
an array of mirror cells for reflecting the light beams received from the second lens;
a color wheel for coloring the reflected light beams; and
a third lens for projecting the colored light beams onto a display.

2. The optical processor as described in claim 1, further comprising a collimator for collimating the generated light beams.

3. The optical processor as described in claim 1, wherein the light source is selected from the group consisting of a laser source and an inductively-coupled-plasma source.

4. The optical processor as described in claim 1, wherein the grating device comprises a plurality of grooves.

5. The optical processor as described in claim 2, further comprising a first slit member for light beams to pass through before entering the collimator.

6. The optical processor as described in claim 1, further comprising a second slit member for light beams to pass through after exiting the second lens.

7. The optical processor as described in claim 1, wherein each of the mirror cells comprises a mirror over a substrate, and a driver for tilting the mirror.

8. The optical processor as described in claim 7, wherein each of the mirror cells further comprises two pedestals positioned around the mirror, for cantilevering the mirror.

9. The optical processor as described in claim 8, wherein each of the mirror cells further comprises two cantilevers for the pedestals to respectively cantilever the mirror.

10. The optical processor as described in claim 7, wherein the mirror comprises a silicon chip.

11. An optical processor comprising:
a light source for generating a plurality of light beams;
a grating device for reflecting and dispersing the generated light beams;
a first lens for imaging the reflected and dispersed light beams;
a reflector for reflecting the imaged light beams;
a second lens for correcting any aberration of the reflected light beams;
a detecting assembly comprising means for reflecting the light beams received from the second lens, and a color wheel for coloring the reflected light beams; and
a third lens for projecting the colored light beams onto a display.

12. The optical processor as described in claim 11, wherein the detecting assembly comprises means for firstly reflecting the light beams to the color wheel, wherein the first reflected light beams serve as a first optical signal, means for secondly reflecting the light beams to a light absorber, wherein the second reflected light beams serve as a second optical signal, and means for thirdly reflecting the light beams to the color wheel, wherein the third reflected light beams serve as a third optical signal.

13. The optical processor as described in claim 12, wherein the detecting assembly further comprises means for digitally displaying the first and third optical signals by projecting the first and third reflected light beams onto a display.

* * * * *